(12) United States Patent
Son et al.

(10) Patent No.: US 12,337,652 B2
(45) Date of Patent: Jun. 24, 2025

(54) ECO-FRIENDLY VEHICLE AND METHOD OF CONTROLLING VALET MODE FOR THE SAME

(71) Applicants: Hyundai Motor Company, Seoul (KR); Kia Corporation, Seoul (KR)

(72) Inventors: Hui Un Son, Gyeonggi-do (KR); Gyu Ri Lee, Gyeonggi-do (KR); Sung Il Jung, Dongnae-Gu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 385 days.

(21) Appl. No.: 18/077,547

(22) Filed: Dec. 8, 2022

(65) Prior Publication Data
US 2023/0211645 A1   Jul. 6, 2023

(30) Foreign Application Priority Data
Mar. 7, 2022 (KR) .................. 10-2022-0028833

(51) Int. Cl.
*B60H 1/00*   (2006.01)
(52) U.S. Cl.
CPC ..... *B60H 1/00778* (2013.01); *B60H 1/00835* (2013.01)
(58) Field of Classification Search
CPC ............ B60H 1/00778; B60H 1/00835; B60H 1/00742; B60H 1/00357; B60H 1/0073; B60W 30/06; B60W 50/10; B60W 10/10; B60W 30/182; B60W 40/10; B60W 2520/10; Y02T 10/88; B60K 11/085; B60Y 2200/92

See application file for complete search history.

(56) References Cited

U.S. PATENT DOCUMENTS

| | | | |
|---|---|---|---|
| 2006/0114101 A1 | 6/2006 | Schambeck et al. | |
| 2007/0210896 A1 | 9/2007 | Schambeck et al. | |
| 2018/0082504 A1 | 3/2018 | Park | |
| 2020/0062076 A1* | 2/2020 | Elson ................ | B60H 1/00735 |
| 2020/0180398 A1 | 6/2020 | Kim | |
| 2021/0048213 A1 | 2/2021 | Albrecht-Buehler et al. | |

FOREIGN PATENT DOCUMENTS

| | | |
|---|---|---|
| JP | 2016-0107769 A | 6/2016 |
| KR | 2006-0114101 A | 11/2006 |
| KR | 10-2012-0073843 A | 7/2012 |

* cited by examiner

*Primary Examiner* — Yuen Wong
(74) *Attorney, Agent, or Firm* — Fox Rothschild LLP

(57) ABSTRACT

Disclosed may be a method of controlling a valet mode of a vehicle, the method including determining whether the vehicle may be in valet mode, when the vehicle may be determined to be in the valet mode, setting the vehicle to a plurality of parking state modes based on the traveling state of the vehicle being parked, and calculating an air conditioning limit power capable of limiting the air conditioning of the vehicle based on each of the valet mode and the plurality of set parking state modes.

20 Claims, 5 Drawing Sheets

ECO-FRIENDLY VEHICLE AND METHOD OF CONTROLLING VALET MODE FOR THE SAME

CROSS-REFERENCE TO RELATED APPLICATIONS

This application claims the benefit of Korean Patent Application No. 10-2022-0028833, filed on Mar. 7, 2022, which is hereby incorporated by reference as if fully set forth herein.

TECHNICAL FIELD

The present disclosure relates to an eco-friendly vehicle capable of limiting air conditioning, when a valet mode is activated, based on a parking or traveling state in consideration of the characteristics of the eco-friendly vehicle, and a method of controlling the valet mode therefor.

BACKGROUND

Valet mode refers to a function that allows a vehicle owner to restrict some functions of the vehicle before delivering the vehicle to another person when someone other than the owner temporarily drives the vehicle, such as using a valet parking service.

Generally, the valet mode may be implemented in the form of recording traveling distance, time, and maximum speed of the vehicle until an engine is turned off and informing the vehicle owner of the recorded information through a smartphone application, or informing the vehicle owner of the same through an in-vehicle output device when the vehicle owner turns off the valet mode. In addition to the method of informing the driver of traveling history of the vehicle recorded in the absence of the driver, in order to protect personal information of the owner, some functions of an audio/video/navigation (AVN) system may be restricted (e.g., locking of navigation destination setting history, disabling access to driver's profile, limiting wireless connection function, etc.). In addition, when the valet mode is activated, access to a predetermined space in the vehicle is restricted, such as locking a trunk or glove box, and engine output or RPM may also be restricted depending on the vehicle.

However, since the above-mentioned general valet mode is controlled by simply being turned on and off, precise control depending on the situation is impossible. Moreover, the characteristics of eco-friendly vehicles such as an electric vehicle (EV) or a hybrid electric vehicle (HEV), which are recently popularized, are not considered at all.

For example, in the valet mode, it is common to drive the vehicle a short distance at a low speed in a parking lot, but the engine may be unnecessarily started due to a situation, such as air conditioning, other than high demand power, but this is not considered at all.

For example, a valet driver takes a break while using excessive air conditioning in the eco-friendly vehicle after parking the vehicle, whereby the engine starts and consumes fuel.

SUMMARY

Accordingly, the present disclosure is directed to an eco-friendly vehicle and a method of controlling valet mode for the same that substantially obviate one or more problems due to limitations and disadvantages of the related art.

An object of the present disclosure is to provide an eco-friendly vehicle capable of limiting air conditioning, when a valet mode is activated, based on a parking or traveling state in consideration of the characteristics of the eco-friendly vehicle, and a method of controlling valet mode therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a method of controlling a valet mode of an eco-friendly vehicle, the method including determining whether the vehicle is in the valet mode, when the vehicle is determined to be in the valet mode, setting the vehicle to a plurality of parking state modes based on the traveling state of the vehicle being parked, and calculating an air conditioning limit power capable of limiting the air conditioning of the vehicle based on each of the valet mode and the plurality of set parking state modes.

The setting may include, in the valet mode, determining whether the parking assist system is activated and, upon determining that the parking assist system (PAS) is activated, setting the parking state mode to a first parking state mode, and in the first parking state mode, determining whether P-position is engaged based on the gear shift information, and upon determining that the P-position is engaged, setting the parking state mode to a second parking state mode.

For example, the calculating an air conditioning limit power may include setting the air conditioning limit power to at least one air conditioning limit range, and applying the set at least one air conditioning limit power level range differently to each of the valet mode, the first parking state mode, and the second parking state mode.

The at least one air conditioning limit power level range may set the first air conditioning limit power level, the second air conditioning limit power level, and the third air conditioning limit power level based on a maximum power capable of controlling air conditioning of the vehicle.

The second air conditioning limit power level may have a maximum value set to be smaller than a maximum value of the first air conditioning limit power level, and set to be greater than a maximum value of the third air conditioning limit power level.

The calculating may include applying the first air conditioning limit power level in the valet mode, applying the second air conditioning limit power level in the first parking state mode, and applying the third air conditioning limit power level in the second parking state mode.

The setting may further include, upon determining that the parking assist system is not activated, determining a condition for requesting opening of an active air flap (AAF) using air conditioning of the vehicle.

The determining may include, when the condition for requesting opening of the active air flap (AAF) is satisfied, setting the third parking state mode.

The condition for requesting opening of the active air flap (AAF) may include that an engine of the vehicle is not operating, that a traveling speed of the vehicle is equal to or greater than a predetermined threshold speed, and that an indoor temperature of the vehicle is greater than or equal to a predetermined threshold temperature.

In another aspect of the present disclosure, an eco-friendly vehicle provided with a valet control unit for controlling a valet mode is provided. The valet control unit may include a determinator configured to determine whether the vehicle is in valet mode, a setter configured to set the vehicle to a plurality of parking state modes based on the traveling state of the vehicle being parked when the vehicle is determined to be in the valet mode, and a power limiter configured to calculate an air conditioning limit power for controlling air conditioning of the vehicle based on each of the valet mode and the plurality of set parking state modes.

The setter may, in the valet mode, determine whether the parking assist system is activated and, upon determining that the parking assist system (PAS) is activated, set the parking state mode to a first parking state mode, and, in the first parking state mode, determine whether P-position is engaged based on the gear shift information and, upon determining that the P-position is engaged, set the parking state mode to a second parking state mode.

The power limiter may set the air conditioning limit power to at least one air conditioning limit range, and apply the set at least one air conditioning limit power level range differently to each of the valet mode, the first parking state mode, and the second parking state mode.

The at least one air conditioning limit power level range may set the first air conditioning limit power level, the second air conditioning limit power level, and the third air conditioning limit power level based on a maximum power capable of controlling air conditioning of the vehicle.

The second air conditioning limit power level may have a maximum value set to be smaller than a maximum value of the first air conditioning limiting power level, and set to be greater than a maximum value of the third air conditioning limiting power level.

The power limiter may apply the first air conditioning limit power level in the valet mode, apply the second air conditioning limit power level in the first parking state mode, and apply the third air conditioning limit power level in the second parking state mode.

The setter may, upon determining that the parking assist system is not activated, determine a condition for requesting opening of an active air flap (AAF) using air conditioning of the vehicle.

The setter may, when the condition for requesting opening of the active air flap (AAF) is satisfied, set the third parking state mode.

The condition for requesting opening of the active air flap (AAF) may include that an engine of the vehicle is not operating, that a traveling speed of the vehicle is equal to or greater than a predetermined threshold speed, and that an indoor temperature of the vehicle is greater than or equal to a predetermined threshold temperature.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
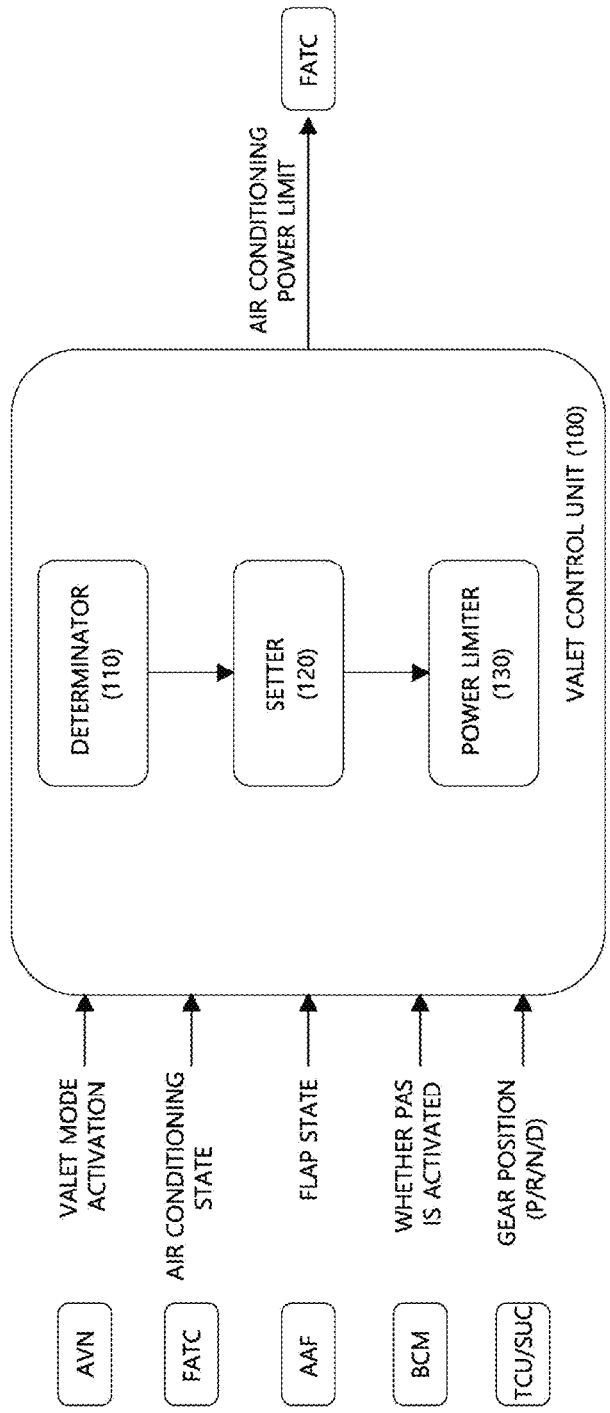
FIG. 1 is a block diagram illustrating an example of the structure of a control unit configured to limit air conditioning during a valet mode according to an embodiment of the present disclosure.

Hereinafter, embodiments of the present disclosure will be described in detail with reference to the accompanying drawings, the same reference numerals are used to designate the same/like components, and a redundant description thereof will be omitted. In general, a suffix such as "module" and "unit" may be used to refer to elements or components. Use of such a suffix herein is merely intended to facilitate description of the specification, and the suffix itself is not intended to have any special meaning or function. In describing the present disclosure, if a detailed explanation of a related known function or construction is considered to unnecessarily distract from the gist of the present disclosure, such explanation, which would be obvious to those skilled in the art, has been omitted. The accompanying drawings are used only to help easily understand the technical idea of the present disclosure, and it should be understood that the idea of the present disclosure is not limiting by the accompanying drawings. The idea of the present disclosure should be construed to encompass any alterations, equivalents and substitutes beyond what is shown in the accompanying drawings.

It will be understood that, although the terms first, second, etc. may be used herein to describe various components, these components should not be limited by these terms. These terms are generally only used to distinguish one element from another.

It will be understood that when an element is referred to as being "connected to" another element, the element can be directly connected to the other element or intervening elements may also be present. In contrast, when an element is referred to as being "directly connected to" another element, there are no intervening elements present.

A singular representation may include a plural representation unless it represents a definitely different meaning from the context.

Terms such as "include" or "has" are used herein and should be understood that the terms are intended to indicate the existence of several components, functions or steps, disclosed in the specification, and it is also understood that greater or fewer components, functions, or steps may likewise be utilized. In addition, "control unit" included in the name of a motor control unit (MCU), a hybrid control unit (HCU), etc. is merely a term widely used in naming a controller that controls a predetermined function of a vehicle, and does not mean a generic functional unit. For example, each control unit may include a communication device configured to communicate with another control unit or sensor so as to control the function it is responsible for, a memory configured to store an operating system or logic commands, input and output information, etc., and one or more processors configured to perform judgment, calculation, decision, etc. needed in controlling the function it is responsible for.

In embodiments of the present disclosure, when an air conditioning control function is provided in an eco-friendly vehicle in valet mode, it is proposed to control an air conditioning limit power level in consideration of the parking state as well as the traveling state of the vehicle in valet mode.

"Valet mode" referred to below may mean a mode in which at least some settings of a vehicle are changed or at least some functions/performance are restricted on the assumption that an owner, a main driver, or a driver who has driven the vehicle to a predetermined area, where the driver is expected to be replaced, will be replaced by another driver. In addition, having a plurality of air conditioning limit power levels may mean that a predetermined level may have at least one of an upper level and a lower level because there is a vertical relationship among the air conditioning limit power levels.

FIG. 1 is a block diagram illustrating an example of the structure of a control unit configured to control air conditioning during a valet mode according to an embodiment of the present disclosure.

Referring to FIG. 1, a valet control unit 100 configured to control air conditioning function in valet mode may have valet mode information, air conditioning information, flap information, PAS mode information, gear stage information, etc. as input information.

In addition, output information may include a control command transmitted to another control unit related to a power limiting function for limiting air conditioning in valet mode.

Valet mode information may be obtained by the audio/video/navigation (AVN) system. The audio/video/navigation (AVN) system may receive various input information from the owner or main user using a user setting menu (USM), and display various valet mode information related to the valet mode.

When at least one of predetermined conditions to enable valet mode is satisfied, it may be determined to activate a valet mode function. For example, the predetermined conditions to enable valet mode may include that a command for enabling valet mode is manually entered by a vehicle owner through the AVN system or the user setting menu (USM), that a command for enabling valet mode is input by remote control using wireless communication (e.g., a command is transmitted via a telematics system, or a command is input from a mobile terminal connected through near field communication such as Wi-Fi or Bluetooth, etc.), that a door sensor detects that a driver's seat door is opened or closed, and a seat sensor senses that a driver's weight is different from a vehicle owner's weight (i.e., a change of driver is detected), that a navigation system detects that the vehicle has reached a preset location (e.g., an airport, hotel, restaurant, parking lot, or location determined by the navigation system to be a valet area, a location preset by a driver, etc.), that the vehicle arrives at a predetermined location set based on big data (e.g., driver's past setting history, other drivers' setting histories, etc.) learned by the navigation system or linked to a telematics center, that a parking assist system (PAS) is activated (the parking assist system may include, but is not limited to, a smart parking assist system (SPAS), a remote parking assist system (RPAS), etc.), and that the vehicle is determined to be in parking lot mode through internal logic based on sensor information of the vehicle (e.g., APS, BPS operation analysis, etc.).

The air conditioning information may be obtained by a fully automatic temperature control (FATC). The fully automatic temperature control (FATC) may be a temperature control device configured to control various motor modules (e.g., mode door motor, air mix door motor, indoor/outdoor door motor) through logical operation in the microcomputer inside the FATC based on the input signal through at least one or more of various sensors (e.g., an inside temperature sensor, an outside temperature sensor, a water temperature sensor, and a line sensor) and a control switch, etc. so as to maintain the indoor temperature at the temperature set by a driver.

Flap information may be obtained by an active air flap (AAF). The active air flap (AAF) is a system configured to control a flap installed to be opened and closed between a radiator grille and a radiator. The active air flap (AAF, hereinafter referred to as AAF) may reduce the air resistance of the vehicle and improve traveling stability by closing the flap during high-speed traveling. In addition, the AAF may function to lower the internal temperature of an engine compartment by opening the flap when there is a risk of overheating of components due to an increase in the temperature inside the engine compartment. For example, the AAF may control the flap to be closed when starting the vehicle so as to reduce the time it takes to heat the cold engine up to a predetermined temperature, may control the flap to be closed when the inflow of external air is unnecessary (minimizing air resistance) when the vehicle is traveling, may control the flap to be opened when the temperature of the engine compartment rises to thereby cause a risk of overheating of components, and may control the flap to be opened so as to maintain the pressure of refrigerant when an air conditioner compressor is operating. In this case, the AAF may serve as an outdoor unit (condenser).

PAS mode information may be obtained by the parking assist system (PAS). The parking assist system (PAS) is a system that uses 4 to 6 ultrasonic sensors attached to the bumper of the vehicle so as to monitor the space in the range of about 0.25 m to 1.5 m at the front and rear of the vehicle, and informs the driver of the presence of an obstacle with an alarm sound. The PAS may include an ultrasonic sensor and a warning device.

Gear stage information may be obtained by a transmission control unit (TCU) and an SBW control unit (SCU). The TCU is a device configured to control an automatic transmission. The TCU may determine when or how to shift gear for optimum control for fuel economy, optimum torque and load by using data provided by the TCU as well as the sensors attached to the vehicle.

The SCU is a control device configured to act as the brain of the transmission. When the SCU is attached to a shift by cable (SBC) transmission, the SCU may convert the SBC system into a shift by wire (SBW) system. Unlike a hydraulic SBW, the SCU changes the travel function using the power of a motor, whereby the SCU may be called "electric SBW". In other words, the SCU receives electrical signals through buttons, levers, and dials and operates the SBC transmission with a motor so as to quickly change travel functions, as well as control the transmission when a dangerous situation occurs to thereby minimize the risk of accidents.

In addition, user input may be input through a command input tool provided in the vehicle, for example, a dial, a key button, a touch button, a touchscreen, etc., or may be transmitted via the telematics center through the manipulation of an application installed in a smart device of a vehicle owner or a user, depending on the structure of the vehicle. The smart device may include, but is not limited to, a smartphone, a smart terminal, a mobile phone, a mobile device, a mobile terminal, and the like.

The source of each of the above-described input information is described based on the initial source of the information, which may be information that is transmitted to the valet control unit 100 via another control unit or that has been processed by being filtering by another control unit, depending on the structure of the vehicle.

Meanwhile, the valet control unit 100 may include a determinator 110, a setter 120, and a power limiter 130. The valet control unit 100 may be referred to as a valet mode control unit.

In implementation, because the valet control unit 100 applicable to the embodiments may accompany the function of controlling a powertrain depending on its level, the valet control unit 100 may be implemented as a higher-level control unit having an integrated control function for the powertrain, such as a vehicle control unit (VCU) in an electric vehicle (EV), a hybrid control unit (HCU) in a hybrid vehicle, and the like, but is not necessarily limited thereto.

Hereinafter, each component of the valet control unit 100 will be described in more detail.

First, the determinator 110 may determine whether at least one of predetermined conditions to enable valet mode is satisfied under the control of the valet control unit 100, and decide to activate the valet mode function when the conditions are satisfied. Examples of the predetermined conditions to enable valet mode are as follows, but are not necessarily limited thereto.

- A command for enabling valet mode is manually entered by a vehicle owner through the AVN system or the user setting menu (USM).
- A command for enabling valet mode is input by remote control using wireless communication (e.g., a command is transmitted via a telematics system, or a command is input from a mobile terminal connected through near field communication such as Wi-Fi or Bluetooth, etc.).
- A door sensor detects that a driver's seat door is opened or closed, and a seat sensor senses that a driver's weight is different from a vehicle owner's weight (i.e., a change of driver is detected).
- A navigation system detects that the vehicle has reached a preset location (e.g., an airport, hotel, restaurant, parking lot, or location determined by the navigation system to be a valet area, a location preset by a driver, etc.).
- The vehicle arrives at a predetermined location set based on big data (e.g., big data may be a driver's past setting history, other drivers' setting histories, etc.) learned by the navigation system or linked to a telematics center.
- A device that has been previously registered through Bluetooth changes to a non-connected state.
- A parking assist system (PAS) is activated (the parking assist system may include, but is not limited to, a smart parking assist system (SPAS), a remote parking assist system (RPAS), etc.).
- The vehicle is determined to be in parking lot mode through internal logic based on sensor information of the vehicle (e.g., APS, BPS operation analysis, etc.).

The above-described determinator 110 may be referred to as a traveling state determinator.

Next, when the vehicle is determined to be in valet mode, the setter 120 may set the vehicle to a plurality of parking state modes based on the traveling state of the vehicle being parked. In other words, when the determinator 110 determines to activate the valet mode function under the control of the valet control unit 100, the setter 120 may set the vehicle to a plurality of parking state modes based on the traveling state of the vehicle being parked. The setter 120 may be referred to as a parking state determinator.

In valet mode, the setter 120 may determine whether the parking assist system is activated. When PAS mode information is obtained during valet mode, the setter 120 may determine that the parking assist system is activated. In other words, when the parking assist system (PAS) is determined to be activated, the setter 120 may set the parking state mode to a first parking state mode. The first parking state mode may be a valet mode and a state in which the parking assist system (PAS) is activated.

In addition, in the first parking state mode, the setter 120 may determine whether P-position is engaged based on gear shift information. When the P-position information is obtained based on the gear shift information during valet mode, the setter 120 may determine that the P-position is engaged. In other words, when the P-position is determined to be engaged, the setter 120 may set the parking state mode to a second parking state mode. The second parking state mode may be a valet mode and a state in which the parking assist system (PAS) is activated and the P-position is engaged.

In addition, when the PAS mode information is not obtained during the valet mode, the setter 120 may determine that the parking assist system is not activated. When the setter 120 determines that the parking assist system is not activated, the setter 120 may determine a condition for requesting opening of the AAF using air conditioning of the vehicle.

When the condition for requesting opening of the AAF is satisfied, the setter 120 may set the third parking state mode. The third parking state mode may be a valet mode and a state that satisfies the condition for requesting opening of the AAF.

For example, when there is a request for opening the AAF using air conditioning in the state in which the valet mode is activated, and when all of the conditions for requesting opening of the AAF are satisfied, the setter 120 may limit the air conditioning (A/C operation is Off and ventilation is maintained) and close the AAF. Examples of the conditions for requesting opening of the AAF are as follows, but are not necessarily limited thereto.

- There is no request for opening the AAF due to temperature rise in the engine compartment.
- The engine is not operating (e.g., EV mode)
- The traveling speed of the vehicle is equal to or greater than a predetermined threshold speed (e.g., when the vehicle speed is less than or equal to 30 kph, the air resistance is low and the effect of closing the AAF is not large, so the corresponding control may not be performed, however, when the wind blows heavily, the predetermined threshold speed may be corrected according to wind direction/wind speed information).
- The indoor temperature is greater than or equal to a predetermined threshold temperature (e.g., when the indoor temperature of an eco-friendly vehicle is 30° C. or higher, the threshold value of the indoor temperature may be set to an appropriate indoor temperature of 20 to 26° C.). The indoor temperature threshold may be manually set by the vehicle owner or a driver. The indoor temperature threshold may be a maximum temperature that may be set by the fully automatic temperature control (FATC) in the vehicle. This indoor temperature threshold may be corrected according to the outdoor temperature/humidity.

In addition to the conditions mentioned earlier, there is no need for inflow of external air into the vehicle.

Next, the power limiter 130 may calculate an air conditioning limit power for controlling the air conditioning of the vehicle based on each of the valet mode and the plurality of set parking state modes. The power limiter 130 may be referred to as an air conditioning limit power calculator.

The power limiter 130 may set the air conditioning limit power to at least one or more air conditioning limit ranges under the control of the valet control unit 100. For example, the power limiter 130 may differently apply the set at least one air conditioning limit power level range to each of the valet mode, the first parking state mode, and the second parking state mode.

At least one air conditioning limit power level range may set the first air conditioning limit power level, the second air conditioning limit power level, and the third air conditioning limit power level based on the maximum power capable of controlling air conditioning of the vehicle.

In other words, the first air conditioning limit power level may have a maximum value greater than the second air conditioning limit power level and the third air conditioning limit power level. The second air conditioning limit power level may have a maximum value greater than the third air conditioning limit power level. Accordingly, the maximum value of the second air conditioning limit power level may be set to be smaller than the maximum value of the first air conditioning limit power level and greater than the maximum value of the third air conditioning limit power level.

The power limiter 130 may calculate the air conditioning limit power based on the first air conditioning limit power level in the case of the valet mode, may calculate the air conditioning limit power based on the second air conditioning limit power level in the case of the first parking state mode, and may calculate the air conditioning limit power based on the third air conditioning limit power level in the case of the second parking state mode.

The air conditioning function being limited during the valet mode by the valet control unit 100 according to an embodiment of the present disclosure described above will be described using graphs as follows.

Figure 2:
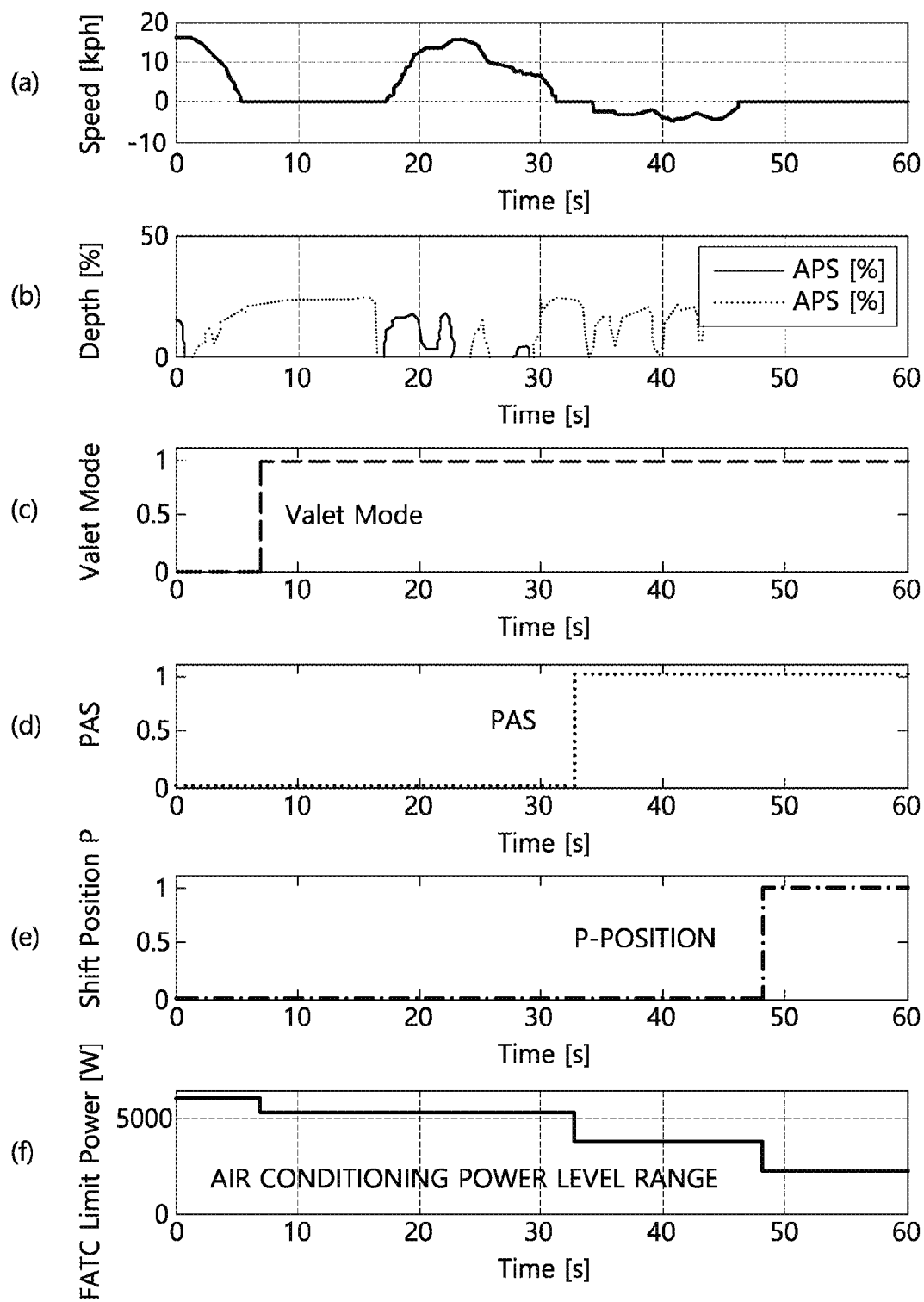
FIGS. 2 and 3 illustrate an example in which an eco-friendly vehicle controls air conditioning when a valet mode is activated according to an embodiment of the present disclosure.
Figure 3:
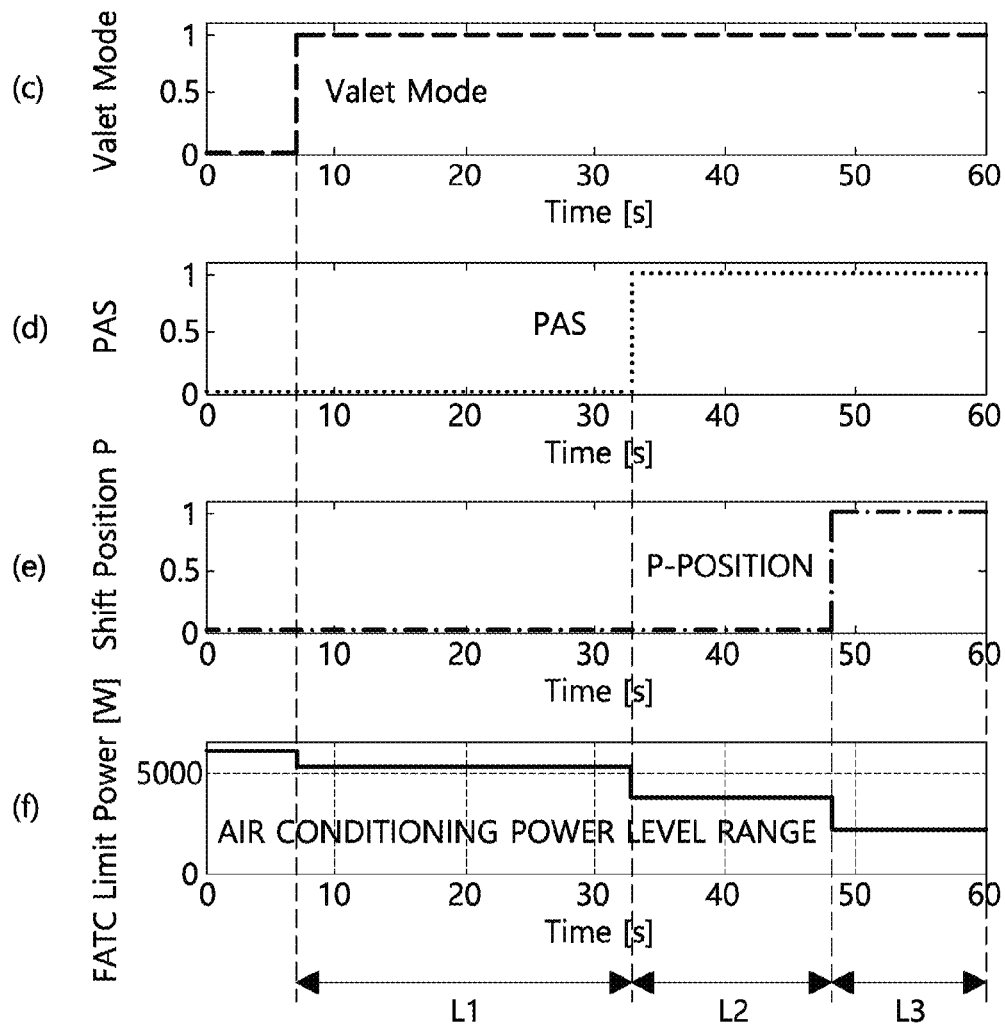

FIGS. 2 and 3 illustrate an example in which an eco-friendly vehicle controls air conditioning when valet mode is activated according to an embodiment of the present disclosure.

Referring to FIGS. 2 and 3, the horizontal axes in the graphs in FIGS. 2 and 3 may denote time, the vertical axis in the graph in FIG. 2(a) may denote speed, the vertical axis in the graph in FIG. 2(b) may denote the depth of pedal depression, the vertical axes in the graphs in FIGS. 2(c) and 3(c) may denote whether the valet mode is activated, the vertical axes in the graphs in FIGS. 2(d) and 3(d) may denote whether the PAS is activated, the vertical axes in the graphs in FIGS. 2(e) and 3(e) may denote whether the P-position is engaged, and the vertical axes in the graphs in FIGS. 2(f) and 3(f) may denote FATC limit power.

FIG. 2(a) shows the speed of the eco-friendly vehicle before and after the valet mode is set according to the passage of time. FIG. 2(b) shows the depth of pedal depression for an accelerator pedal sensor (APS) (solid line) and a brake pedal sensor (BPS) (dotted line) of the eco-friendly vehicle operated before and after the valet mode is set, FIGS. 2(c) and 3(c) show that the valet mode is activated in the eco-friendly vehicle, FIGS. 2(d) and 3(d) show that the PAS is activated in the eco-friendly vehicle, FIGS. 2(e) and 3(e) show that P-position is engaged in the eco-friendly vehicle, and FIGS. 2(f) and 3(f) show that the range of the air conditioning limit power level is set under the control of the valet control unit.

Referring to FIGS. 2(c) to 2(f) and 3(c) to 3(f), the power limiter 130 may differently apply the air conditioning limit power to each of the valet mode, the first parking state mode, and the second parking state mode, under the control of the valet control unit 100.

The range of the air conditioning limit power level may include the first air conditioning limit power level, the second air conditioning limit power level, and the third air conditioning limit power level.

The power limiter 130 may automatically activate the existing economic air conditioning mode when the valet mode is activated under the control of the valet control unit 100.

When the valet mode is activated under the control of the valet control unit 100, the power limiter 130 may calculate the air conditioning limit power based on the first air conditioning limit power level L1. The first air conditioning limit power level L1 may be a power level in which the existing air conditioning limit power level is lowered. The power limiter 130 may further lower the first air conditioning limit power level L1 after applying the existing air conditioning limit power under the control of the valet control unit 100.

Thereafter, when the vehicle is in the first parking state mode (PAS is activated) in the state in which the valet mode is activated under the control of the valet control unit 100, the power limiter 130 may calculate the air conditioning limit power based on the second air conditioning limit power level. The second air conditioning limit power level L2 may be a power level in which the first air conditioning limit power level L1 is lowered. The power limiter 130 may further lower the second air conditioning limit power level L2 after applying the first air conditioning limit power level L1 under the control of the valet control unit 100. This is because the eco-friendly vehicle will be parked and the use of the vehicle will soon end, and thus, excessive air conditioning is unnecessary.

Thereafter, when the vehicle is in the second parking state mode (P-position is engaged) in the state in which the valet mode and the first parking state mode (PAS is activated) are activated under the control of the valet control unit 100, the power limiter 130 may calculate the air conditioning limit power based on the third air conditioning limit power level L3. The third air conditioning limit power level L3 may be a power level in which the second air conditioning limit power level L2 is lowered. The power limiter 130 may further lower the third air conditioning limit power level L3 after applying the second air conditioning limit power level L2 under the control of the valet control unit 100.

This may limit unnecessary air conditioning when the use of the eco-friendly vehicle ends and prevent the valet driver from resting in the vehicle.

The valet control unit 100 described above may control the power limiter 130 to set the air conditioning limit power to at least one air conditioning limit power level range based on a preset factor. For example, the power limiter 130 may set the first air conditioning limit power level to the third air conditioning limit power level by applying the preset factor to the existing air conditioning limit power. For example, the preset factor may be set differently depending on the set parking state mode. For example, the power limiter 130 may set a preset factor to 0.7 to calculate the air conditioning limit power when only the valet mode is activated under the control of the valet control unit 100, may set the preset factor to 0.5 to calculate the air conditioning limit power when valet mode and PAS are both activated, and may set the preset factor to 0.3 to calculate the air conditioning limit power when valet mode and PAS are activated, and P-position is engaged.

As described above, the present disclosure may limit the air conditioning limit power. However, the air conditioning limit power may not be limited at the minimum value of the same, and may be limited at the maximum value of the same when the allowable power is equal to or greater than a set value. In other words, in the present disclosure, a case in which the actual air conditioning allowable power is very low depending on a situation may be considered.

For example, when the maximum value of the first air conditioning limit power level is set to 50,000, the maximum value of the second air conditioning limit power level is set to 40,000, the maximum value of the third air conditioning limit power level is set to 30,000, and the current allowable power is 60,000, the air conditioning limit power level may be limited to 50,000, which is the maximum value of the first air conditioning limit power level, may be limited to 40,000, which is the maximum value of the second air conditioning limit power level, and may be limited to 30,000, which is the maximum value of the third air conditioning limit power level.

For example, when the maximum value of the first air conditioning limit power level is set to 50,000, the maximum value of the second air conditioning limit power level is set to 40,000, the maximum value of the third air conditioning limit power level is set to 30,000, and the current allowable power is 35,000, the air conditioning limit power level may be limited to 35,000, which is the maximum value of the first air conditioning limit power level, may be limited to 35,000, which is the maximum value of the second air conditioning limit power level, and may be limited to 30,000, which is the maximum value of the third air conditioning limit power level.

For example, when the maximum value of the first air conditioning limit power level is set to 50,000, the maximum value of the second air conditioning limit power level is set to 40,000, the maximum value of the third air conditioning limit power level is set to 30,000, and the current allowable power is 45,000, the air conditioning limit power level may be limited to 45,000, which is the maximum value of the first air conditioning limit power level, may be limited to 40,000, which is the maximum value of the second air conditioning limit power level, and may be limited to 30,000, which is the maximum value of the third air conditioning limit power level.

Figure 4:
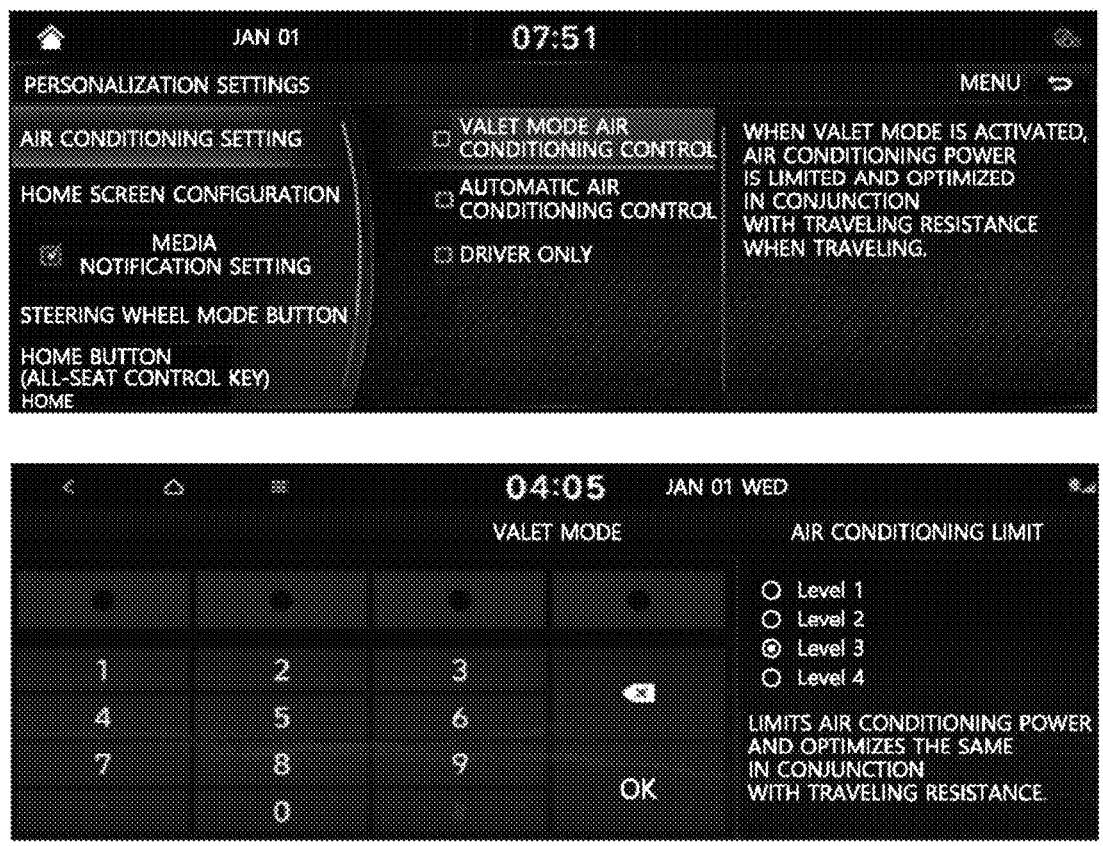
FIG. 4 illustrates an example of a form in which a plurality of air conditioning limit power levels is set according to an embodiment of the present disclosure.

FIG. 4 illustrates an example of a form in which each of the levels is set for a corresponding function according to an embodiment of the present disclosure.

Referring to FIG. 4, a user may access the user setting menu (USM) for the valet mode through a predetermined command input using the AVN system or the like.

For example, a user may access a level setting menu for setting the air conditioning or the level setting menu for limiting the air conditioning limit power level in the user setting menu for the valet mode.

In each menu, a function to be currently set, a set air conditioning limit power level, and a description of the function of the set air conditioning limit power level may be displayed.

Figure 5:
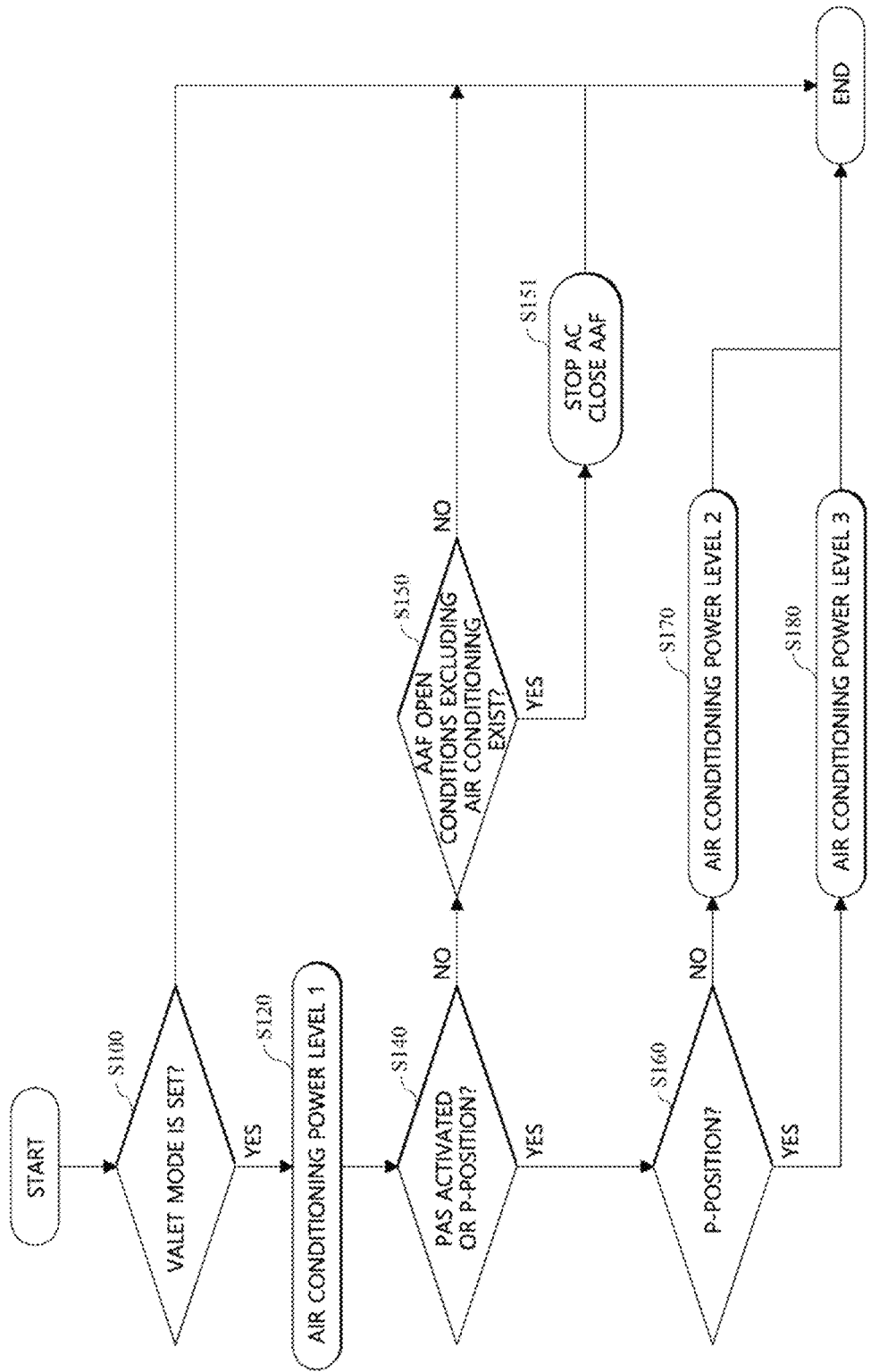
FIG. 5 is a flowchart showing an example of a control process for limiting air conditioning during a valet mode according to an embodiment of the present disclosure.

When the valet mode described so far is activated, the control process for limiting the air conditioning is summarized as a flowchart in FIG. 5.

FIG. 5 is a flowchart showing an example of the control process for limiting air conditioning during a valet mode according to an embodiment of the present disclosure.

Referring to FIG. 5, first, the determinator 110 of the valet control unit 100 may determine whether the conditions to enable valet mode are satisfied (S100).

When the determinator 110 determines that at least one of the conditions to enable valet mode is satisfied, the setter 120 may set the vehicle to a plurality of parking state modes based on the traveling state of the vehicle being parked in the case of the valet mode.

In the valet mode (S100—YES), the setter 120 may determine whether the parking assist system is activated (S140). Upon determining that the parking assist system (PAS) is activated (S140—YES), the parking state mode may be set as a first parking state mode.

In the first parking state mode (S140—YES), the setter 120 may determine whether P-position is engaged based on the gear shift information (S160). Upon determining that the P-position is engaged (S160—YES), the parking state mode may be set as a second parking state mode.

When the setter 120 determines that the parking assist system is not activated (S140—NO), the setter 120 may determine a condition for requesting opening of AAF using air conditioning of the vehicle (S150).

When the setter 120 determines that the condition for requesting opening of the AAF is satisfied (S150—YES), the setter 120 may set the third parking state mode. The third parking state mode may be a valet mode and a state that satisfies the condition for requesting opening of the AAF (S151).

Here, the condition for requesting opening of the AAF may include that an engine of the vehicle is not operating, that a traveling speed of the vehicle is equal to or greater than a predetermined threshold speed, and that an indoor temperature of the vehicle is greater than or equal to a predetermined threshold temperature.

Next, the power limiter 130 may calculate an air conditioning limit power capable of limiting the air conditioning of the vehicle based on each of the valet mode and the plurality of set parking state modes.

The power limiter 130 may set the air conditioning limit power to at least one or more air conditioning limit ranges, and then may differently apply the set at least one air conditioning limit power level range to each of the valet mode, the first parking state mode, and the second parking state mode.

At least one air conditioning limit power level range may set a first air conditioning limit power level, a second air conditioning limit power level, and a third air conditioning limit power level based on the maximum power for controlling air conditioning of the vehicle. Here, the maximum value of the second air conditioning limit power level may be set to be smaller than the maximum value of the first air conditioning limit power level and greater than the maximum value of the third air conditioning limit power level.

The valet control unit 100 may control the power limiter 130 to apply the first air conditioning limit power level in valet mode (S120), to apply the second air conditioning limit power level in the first parking state mode (S160-NO, S170), and to apply the third air conditioning limit power level in the second parking state mode (S180).

When the valet mode is activated according to various embodiments of the present disclosure as described above, at least one parking state mode is set based on the traveling state of the eco-friendly vehicle being parked and the air conditioning limit power capable of controlling the air conditioning is limited corresponding to the set at least one parking state mode, thereby preventing unnecessary fuel consumption.

In addition, according to various embodiments of the present disclosure, when the valet mode is activated and a large traveling resistance occurs depending on the traveling situation of the eco-friendly vehicle when opening of the AAF is requested due to air conditioning, the air conditioning of the eco-friendly vehicle is restricted to improve fuel efficiency.

The effects obtained by the present disclosure are not limited to the effects mentioned above, and other effects not mentioned above will be clearly understood by those skilled in the art based on the following description.

In the embodiments described so far, the level indexing expressed such as 1 to 3 is merely an example and means that the control method and type change as the level changes. Therefore, it is apparent to those skilled in the art that other expressions maintaining the meaning, such as A, B, C, D, or 4, 3, 2, 1, are possible.

In addition, it goes without saying that two or more of the above-described levels may be integrated into one, or may be subdivided into lower levels depending on conditions within the same level.

Meanwhile, the present disclosure can be implemented as computer-readable code in program-recorded media. The computer readable medium includes all kinds of recording devices in which data readable by a computer system is stored. Examples of such computer-readable media may include a hard disk drive (HDD), a solid state drive (SSD), a silicon disk drive (SDD), ROM, RAM, CD-ROM, magnetic tape, a floppy disk, an optical data storage element and the like. Accordingly, the above detailed description should not be interpreted as limiting in all aspects, but should be considered as illustrative. The scope of the disclosure should be determined by reasonable interpretation of the appended claims, and all changes within the equivalent scope of the disclosure are included in the scope of the disclosure.

What is claimed is:

1. A method of controlling a valet mode of a vehicle, the method comprising:
   determining whether the vehicle is in the valet mode;
   when the vehicle is determined to be in the valet mode, setting the vehicle to one of a plurality of parking state modes based on a traveling state of the vehicle being parked; and
   calculating an air conditioning limit power capable of limiting an air conditioning (AC) of the vehicle based on the valet mode and the one of the plurality of set parking state modes.

2. The method according to claim 1, wherein the setting comprises:
   in the valet mode, determining whether a parking assist system (PAS) is activated;
   upon determining that the PAS is activated, setting a first of the plurality of parking state modes to a first parking state mode;
   in the first parking state mode;
   determining whether P-position is engaged based on gear shift information; and
   upon determining that the P-position Is engaged, setting a second of the parking state modes to a second parking state mode.

3. The method according to claim 2, wherein the calculating the air conditioning limit power comprises:
   applying a plurality of air conditioning limit power level ranges differently for each of the valet mode, the first parking state mode, and the second parking state mode; and
   setting the air conditioning limit power to at least one of the plurality of air conditioning limit power level ranges.

4. The method according to claim 3, wherein the plurality of air conditioning limit power level ranges sets a first air conditioning limit power level, a second air conditioning limit power level, and a third air conditioning limit power level based on a maximum power capable of controlling air conditioning of the vehicle.

5. The method according to claim 4, wherein the second air conditioning limit power level has a second maximum value set to be smaller than a first maximum value of the first air conditioning limit power level, and set to be greater than a third maximum value of the third air conditioning limit power level.

6. The method according to claim 5, wherein the calculating comprises:
   applying the first air conditioning limit power level in the valet mode;
   applying the second air conditioning limit power level in the first parking state mode; and
   applying the third air conditioning limit power level in the second parking state mode.

7. The method according to claim 2, wherein the setting further comprises, upon determining that the PAS is not activated, determining a condition for requesting opening of an active air flap (AAF) using air conditioning of the vehicle.

8. The method according to claim 7, wherein the determining the condition for requesting opening of the AAF using air conditioning of the vehicle comprises, when the condition for requesting opening of the AAF is satisfied, stopping AC and closing the AAF.

9. The method according to claim 8, wherein the condition for requesting opening of the AAF comprises:
   an engine of the vehicle is not operating;
   a traveling speed of the vehicle is equal to or greater than a predetermined threshold speed; and
   an indoor temperature of the vehicle is greater than or equal to a predetermined threshold temperature.

10. A non-transitory computer-readable recording medium for recording a program for executing the method of controlling the valet mode of the vehicle according to claim 1.

11. A valet control unit for controlling a valet mode, comprising:
    a processor configured to:
    determine whether the vehicle is in the valet mode;
    set the vehicle to one of a plurality of parking state modes based on a traveling state of the vehicle being parked when the vehicle is determined to be in the valet mode; and
    calculate an air conditioning limit power for controlling air conditioning of the vehicle based on the valet mode and the one of the plurality of parking state modes.

12. The valet control unit according to claim 11, wherein the processor, in the valet mode, is configured to determine whether a parking assist system (PAS) is activated, and upon determining that the PAS is activated, set a first of the plurality of parking state modes to a first parking state mode; and in the first parking state mode, determine whether P-position is engaged based on the gear shift information, and upon determining that the P-position is engaged, set a second of the plurality of parking state modes to a second parking state mode.

13. The valet control unit according to claim 12, wherein the processor is configured to:
    apply a plurality of air conditioning limit power level ranges differently to each of the valet mode, the first parking state mode, and the second parking state mode, and set the air conditioning limit power to at least one of the plurality of air conditioning limit level ranges.

14. The valet control unit according to claim 13, wherein the processor is configured to:
    set the air conditioning limit power to a first air conditioning limit power level,
    a second air conditioning limit power level, and
    a third air conditioning limit power level based on a maximum power capable of controlling air conditioning of the vehicle.

15. The valet control unit according to claim 14, wherein the second air conditioning limit power level has a second maximum value set to be smaller than a first maximum value of the first air conditioning limiting power level, and set to be greater than a third maximum value of the third air conditioning limiting power level.

16. The valet control unit according to claim 15, wherein the processor is configured to:
    apply the first air conditioning limit power level in the valet mode,
    apply the second air conditioning limit power level in the first parking state mode, and
    apply the third air conditioning limit power level in the second parking state mode.

17. The valet control unit according to claim 12, wherein the processor is configured to, upon determining that the PAS is not activated, determine a condition for requesting opening of an active air flap (AAF) using air conditioning of the vehicle.

18. The valet control unit according to claim 17, wherein the processor is configured to, when the condition for requesting opening of the AAF is satisfied, set a third parking state mode.

19. The valet control unit according to claim 18, wherein the condition for requesting opening of the AAF comprises:
    an engine of the vehicle is not operating;
    a traveling speed of the vehicle is equal to or greater than a predetermined threshold speed; and
    an indoor temperature of the vehicle is greater than or equal to a predetermined threshold temperature.

20. A vehicle comprising the valet control unit of claim 11.

* * * * *